United States Patent [19]

Cone et al.

[11] 4,115,178

[45] Sep. 19, 1978

[54] METHOD OF MAKING GLUED, LAMINATED ASSEMBLIES IN PREPRESSED AND FINAL PRESSED STAGES

[75] Inventors: Charles N. Cone, Portland; Julius M. Steinberg, Hillsboro, both of Oreg.

[73] Assignee: Pacific Adhesives, Inc., Hillsboro, Oreg.

[21] Appl. No.: 798,581

[22] Filed: May 19, 1977

Related U.S. Application Data

[63] Continuation of Ser. No. 624,383, Oct. 21, 1975, abandoned, which is a continuation of Ser. No. 345,107, Mar. 26, 1973, abandoned.

[51] Int. Cl.² ............. B32B 7/14; B32B 31/00; C09J 5/00
[52] U.S. Cl. ............................ 156/291; 156/295; 156/312; 156/335;295
[58] Field of Search ........... 156/79, 291, 309, 312, 156/327, 335, 295; 264/46.1, 46.3, 191

[56] References Cited

U.S. PATENT DOCUMENTS

| 2,205,600 | 6/1940 | Payzano | 156/291 |
| 2,290,548 | 7/1942 | Galber | 156/295 |
| 2,872,965 | 2/1959 | Sisson | 264/46.1 |
| 3,578,543 | 5/1971 | Cook et al. | 156/157 |
| 3,706,619 | 12/1972 | Freeman | 156/315 |
| 3,829,338 | 8/1974 | Hayasi et al. | 156/210 |
| 3,895,984 | 7/1975 | Cone et al. | 156/79 |
| 3,929,695 | 12/1975 | Murata et al. | 156/335 |

*Primary Examiner*—Douglas J. Drummond
*Attorney, Agent, or Firm*—Eugene D. Farley

[57] ABSTRACT

Plywood and other glued, laminated assemblies are made by spreading a liquid foamed glue on a surface of a first lamina. A second lamina is superimposed and, while the glue is in a fluid condition, the resulting assembly is prepressed under pressure sufficient to spread the glue and to wet and unite the opposed faces of the laminae. This forms a flat, self-sustaining intermediate laminate which thereafter may be pressed further to develop the glue bond between the laminae.

10 Claims, 8 Drawing Figures

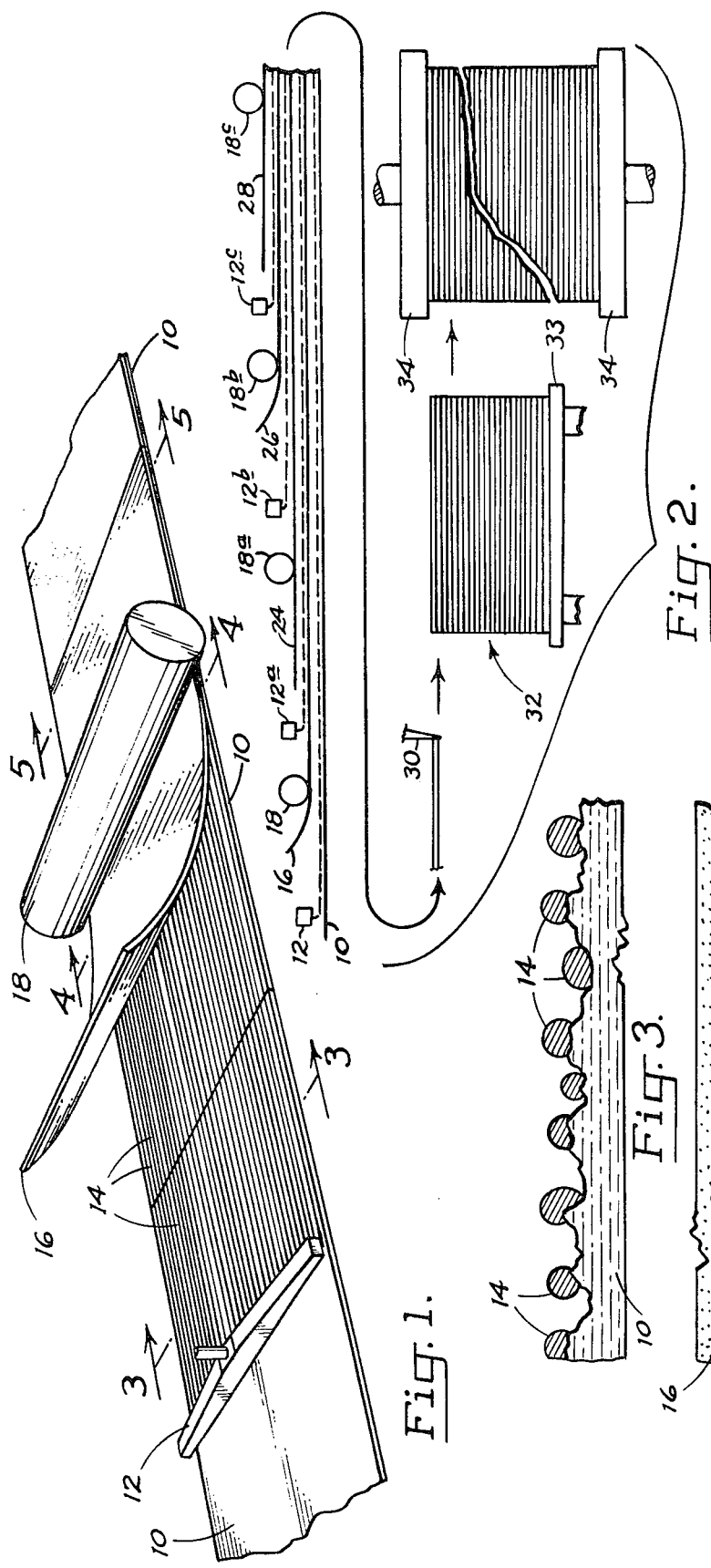
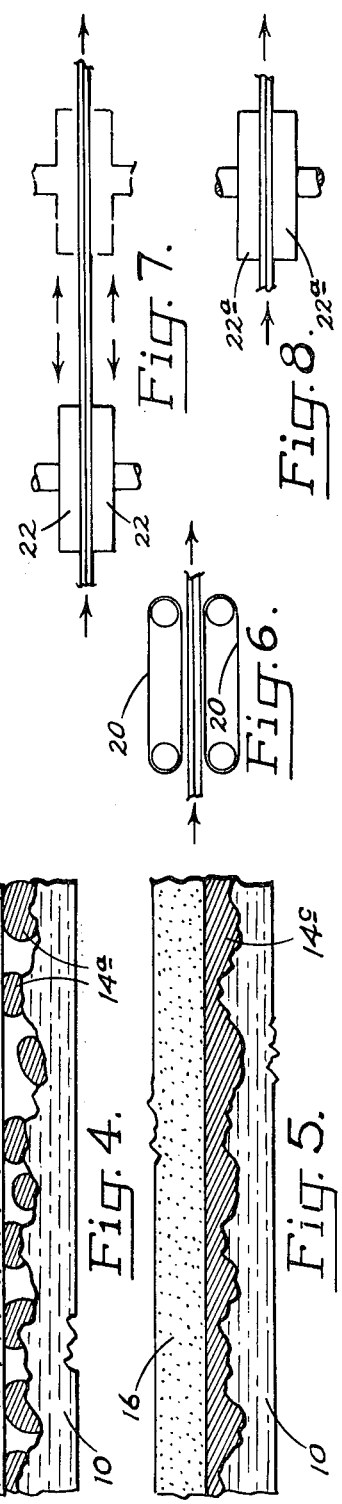

METHOD OF MAKING GLUED, LAMINATED ASSEMBLIES IN PREPRESSED AND FINAL PRESSED STAGES

This is a continuation of application Ser. No. 624,383, filed Oct. 21, 1975, now abandoned, which is a continuation of application Ser. No. 345,107, filed Mar. 26, 1973 now abandoned.

This invention relates to glued laminated assemblies. It pertains particularly to plywood made by gluing wood veneers with liquid, foamed glue in prepress and final press stages.

In the manufacture of plywood, it is conventional practice to spread wood veneers with plywood glue and to composite the spread veneers with unspread veneers into a panel assembly. The individual veneers have an uneven profile and do not lie flat in the panel assembly. As a result, the assembly has a thickness much greater than that of the panel into which it will be pressed.

For this reason, it is common practice to prepress a stack of such panel assemblies preliminary to introducing them into the plywood presses where final bonding is achieved. The prepressing is carried out in flat bed presses. It has the advantage of facilitating the use of mechanical press loaders, of reducing the number of reject panels produced in the final pressing operation; and of making possible the use of thinner press openings and therefore more openings for a given press height.

The use of mechanical press loaders is facilitated since the assemblies are prepressed into boards which are self-sustaining and compact. They stack and are handled with facility.

Whereas the uncompacted assemblies are difficult to insert into the narrow openings between the press platens, prepressing tacks the beneers together with weak bonds, which nevertheless are strong enough to hold the veneers together. This forms flat intermediate products that are much more easily loaded into narrow press openings.

Prepressing reduces the number of reject panels produced because it precludes loading into the press an assembly of loose veneers which might become, rearranged and thus produce faulty products.

The flat bed prepresses in which the prepressing operation conventionally is carried out process a stack of panel assemblies many panels thick. The stack is accumulated over a period of time. Panel assembly times of 15 to 20 minutes at the bottom of the stack and 2 to 4 minutes at the top of the stack are common.

In this situation, the fluidity of the glue layers in the panel assemblies varies from the bottom to the top of the stack. It is dependent on the amount of time that elapses after the wet glue layers of each panel assembly are brought into contact with dry wood.

The moment contact is made between the wet glue layer and the dry wood, water starts to migrate from glue to wood and the glue layer progressively loses fluidity. Because they are in contact with the wood for a longer time, the fluidity of the glue layers at the bottom of the load i.e. those of the panel assemblies having long assembly times, is much less than is that of the glue layers at the top of the load, i.e. those present in the panel assemblies of short assembly time.

This discrepancy is overcome in the prepress by applying pressures sufficient to cause the glue in the lower layers to flow into contact with the opposing veneer surfaces. As a result, the glue layers in the top of the load are subjected to much more pressure than is required, and over penetration of glue into the wood results. This degrades the bond in the final product. Conversely, in the long assembly time areas, the glue layers are relatively lacking in fluidity and do not readily wet the opposing veneer surfaces. This, too, causes glue bond failues.

It is the general purpose of the present invention to provide a method for making glued, laminated assemblies, particularly plywood, which overcomes the foregoing difficulties of the prior art methods and which additionally is readily adaptable to the large scale continuous production of such products at relatively low cost, using diverse glues and laminar species, and with the production of a product of superior properties.

The presently described method broadly comprises spreading on a surface of a first lamina a selected liquid foamed glue. A second lamina is superimposed on the surface of the first lamina on which the glue has been spread.

While the glue is in a fluid condition, the resulting assembly promptly is prepressed under pressure sufficient to spread the foamed glue to wet with glue the opposed faces of the laminae, and the bond the laminae together. This may be accomplished most advantageously in a continuous process by roller prepressing. It forms a substantially flat, self-sustaining intermediate laminated product which may be stacked, introduced with facility into a cold or hot press, and then pressed further to develop the glue bond between the laminae to its final condition.

In the drawings:

FIG. 1 is a view in perspective of schematically illustrated apparatus for executing the herein described method as applied to the manufacture of plywood;

FIG. 2 is a schematic view in side elevation further illustrating the method;

FIGS. 3, 4 and 5 are fragmentary sectional views taken along lines 3, 4 and 5, respectively of FIG. 1 and illustrating the progressive alteration of the glue applied to join the laminae; and FIGS. 6 and 7 are schematic views in side elevation illustrating alternate prepress means for use in the execution of the method; and FIG. 8 is a schematic view illustrating still another prepress means for use in the execution of the method.

Considering the foregoing in greater detail and with particular reference to the drawings:

The method of the invention is applicable to making glued, laminated assemblies from a variety of laminae species including plastic, metal and wood. It is particularly applicable to the making of plywood from wood veneers and is described herein with reference to that application.

In the manner of executing the method of the invention illustrated in FIGS. 1 and 2, a plurality of plywood veneers 10, arranged in a continuous ribbon, or discontinuously are conveyed past a glue-spreading station on a suitable conveyer, not illustrated. The grain of the veneers 10 normally runs in the direction of travel of the veneers.

At the glue-spreading station there is located a foamed glue extrusion head illustrated schematically at 12. This may be of the construction described and illustrated in the U.S. Pat. of Charles N. Cone and Julius M. Steinberg, No. 3,895,984 for PLYWOOD MANUFACTURE USING FOAMED GLUES.

A liquid glue and a suitable gas are introduced from appropriate sources in metered flow into the head. The liquid glue may comprise any foamable liquid glue including blood and other protein glues, and the various synthetic resin glues, particularly the phenol-formaldehyde, the resorcinol-formaldehyde, the cresylic acid-formaldehyde, and the urea-formaldehyde glues. These normally are mixed with gases such as air or nitrogen in the preparation of the foamed product.

In general, as much gas is supplied to the foaming unit as the liquid will accept. This in turn depends upon the nature of the liquid, the temperature, and the manner of operation of the foaming unit. If too much air is introduced, there is produced a non-uniform foam containing pockets of air which escape from the foam as undesirable, large bubbles when the foam is released from the system.

In the manufacture of foamed plywood glue, the relative amounts of gas and liquid adhesive admitted to the foaming unit are regulated in such a manner as to produce a foam having a weight-to-volume ratio of from 0.1 to 0.5, preferably from 0.15 to 0.3 grams per cc. The unfoamed liquid glue has a density of about 1.15. The net effect thus is to expand the glue to four to six times its original volume by converting it to a foam.

Since the foamed product is driven by a positive pump drive, it moves out of the foaming unit at the same rate that it enters, in terms of pounds per minute. However, in terms of cubic inches per minute it moves out about five times as fast as it enters.

Although the foam may be extruded as a continuous sheet, it preferably is passed through nozzles which extrude it in the form of filaments or rods 14. These will have a cross sectional shape determined by the shape of the nozzle. In the illustrated form of the invention the shape is round.

Since the filaments or rods are extruded onto an underlying lamina such as a sheet of plywood veneer which is moving relative to the head, the rods are applied longitudinally of the lamina, substantially parallel to each other. The lateral spacing is determined by the lateral spacing of the nozzles. In a typical instance, it may run from ⅛ to ½ inch. The diameter of the filaments may vary, for example, from 1/64 to ⅜ inch. As shown in FIGS. 3 and 4, the veneer surface in the spaces between the filaments is substantially unwetted by the glue.

As will appear hereinafter, it is a feature of the invention that foamed filaments of large cross section may be employed without adversely affecting the quality of the resulting glued product. This in turn means that extruding nozzles of large cross section may be used. A material advantage results by reason of the fact that large nozzles are not easily plugged by the solid particles often present in the liquid glue, thereby insuring uniformity of application.

The substrate laminae 10 having the cross sectional appearance of FIG. 3 next pass to a station at which laminae 16 are superimposed on the surface of the substrate laminae upon which the glue has been spread. In the case of plywood veneers, the superimposed laminae are laid on the substrate laminae cross grain, with the side edges substantially registering with the side edges of the underlying laminae 10.

Superimposing the overlying laminae has the natural consequence of partially flattening and spreading foamed glue filaments 14 so that the assembly has the cross sectional appearance illustrated in FIG. 4.

Next, the partially completed assembly passes beneath the prepressing station wherein the rods or filaments of foamed glue are squashed and spread to form a continuous glue interface between the layers. This wets the opposed faces of both the upper and lower layers and produces the condition illustrated in FIG. 5.

The amount of pressure applied at the prepressing station is not equal in magnitude to the pressure required to produce the final laminated assembly. Rather, it is sufficient merely to tack the laminae together so that they lie flat and form a "board," which may be handled, stacked, and introduced into the final press without difficulty.

Various types of prepresses may be employed. It is preferred to employ roller prepresses, indicated schematically at 18. Either a single roller working against a bed, or opposed cooperating rollers may be employed. These are driven at a speed corresponding to the rate of travel of the work. They exert a pressure on the work of from 60–90 lbs. per lineal foot of roll.

In the alternative, cooperating endless press belts illustrated at 20 of FIG. 6 may be used in place of roller 18.

Still another applicable form of prepress comprises opposed platens 22, 22a. These may either shuttle back and forth to accommodate the continuously moving work, as illustrated in FIG. 7; or be stationary to accommodate work having an interrupted path of forward travel, as indicated in FIG. 8.

Normally as many laminae may be laid up in the foregoing manner as is desirable or necessary. In the manufacture of five ply plywood five laminae are assembled cross grain, in the manner illustrated schemtically in FIG. 2.

In this application of the method there are four foamed glue-applying stations provided with extrusion heads 12, 12a, 12b, 12c. These are alternated with four prepressing units 18, 18a, 18b and 18c. The five veneers 10, 16, 24, 26, 28 thus are united into a longitudinally continuous or discontinuous five ply assembly which is conveyed to a cutting station where it is cut to length, if continuous, by cutting means indicated generally at 30. This may be a guillotine type cutter, but more commonly comprises a flying saw.

The prepressed panel assemblies next are arranged in a stack 32 on a press loader 35 of conventional design. When a sufficient number of panels has accumulated on the loader, the load is transferred to a flatbed press indicated schematically at 34. This may be either a cold press or a hot press depending on whether cold press or hot press glue has been applied to the laminae. If a hot press, the press assembly includes a plurality of hot platens (not illustrated) interleaved with the panel assemblies. The panels are pressed at the desired temperatures, pressures and durations until the glue has been set.

Proceeding in the manner outlined above has significant advantages:

Prepressing by tacking the veneers together produces flat "boards" that are easily and accurately loaded into narrow press openings.

The use of foamed glue improves the efficiency of the prepressing operation. As illustrated in FIGS. 4 and 5, the opposed surfaces of plywood veneers are irregular. When the veneers are laid up, they contact each other only at the high spots. Over a large proportion of the area there is space separating the two veneer surfaces. In order for glue to hold the two opposing surfaces together, the glue must fill the space between, and wet both veneer surfaces.

The average thickness of an applied layer of unfoamed glue is only about five thousands of one inch. This is not sufficient to fill the gap. However, using foamed glues, it easily is possible to provide a layer having an average thickness of three hundreths of one inch. As is clearly evident from FIG. 5, this is sufficient to fill the gap, to space the veneers apart with a layer or mat of foamed glue, and to completely wet both veneer surfaces, insuring efficient bonding.

Where automated layup lines are used, prepress rollers may be mounted in the line just downstream from each spreading station. In this way prepressing is done while the press load is being assembled and the time, labor and equipment required for a conventional flatbed prepressing is eliminated.

Pressure is applied to each panel assembly while the glue is freshly deposited and still retains a maximum degree of fluidity. It can, therefore, be pushed and spread with relatively light pressure into intimate contact with both of the opposing veneer surfaces.

The assembly time problems which plague conventional flatbed prepressing operations are eliminated.

In conventional flatbed prepressing, a press load is accumulated before pressure is applied. In this situation the fluidity of the layers of glue in the press load varies from the bottom to the top of the load depending on the amount of time that has elapsed since the layer was deposited, and the wet glue thereby brought into contact with dry wood. The moment this contact is made, water starts to migrate from glue to wood and the glue layer progressively loses fluidity.

Assembly times of from 15 to 20 minutes at the bottom of the press load and 2 to 4 minutes at the top of the press load are common. Because they have been in contact with the wood for a longer time, the fluidity of the glue layers at the bottom of the load is much less than is the fluidity of the glue layers at the top of the load.

As a consequence, the glue layers in the top of the load must be subjected to more pressure than is needed, and over penetration of the glue into the wood may result. Even with the application of increased pressure, because of the loss of water from the glue line by penetration into the wood and consequent hardening of the glue, defective bonding and resultant failure of the glue layers at the bottom of the load may result. By comparison, when prepressing assemblies spread with foamed glue, while the glue is freshly deposited and still retains a maximum degree of fluidity, there is no variation in the time between glue application and the application of prepressing pressure. Therefore, at the time of prepressing there is no variation in glue fluidity to cause variations in degree of glue penetration.

Roller prepressing aids foam extrusion. As noted above, rods or filaments of foamed glue of substantial diameter spread far apart may be employed. Consequently, these may be spread using extrusion tubes of large diameter, spaced relatively far apart, which do not clog easily. Since in roller prepressing the prepress pressure is applied immediately after the glue is deposited, the glue retains its fluidity and is spread uniformly upon prepressing even though large filaments spaced relatively far apart are employed.

In roller prepressing with foamed glue, the glue completely wets both of the opposing veneer surfaces at the very start. Accordingly, even though the glue layer progressively loses fluidity as time elapses, the desired result has been achieved and the task of forcing a reluctantly flowing glue layer into intimate contact with the minute irregularities of unwetted veneer surfaces has been avoided.

Stated otherwise, when prepressing panel assemblies using foamed glue instead of liquid glue, the prepressing pressure may be applied uniformly within a very few seconds after the glue has been spread. The lapse of time before prepressing is the same for all assemblies. Hence there is no top or bottom panel effect.

Also, the pressure is applied for but a fraction of a second. Because the glue is foamed and thereby greatly expanded in volume and because the pressure is applied very soon after the glue first makes contact with the veneers and therefore retains most of its original fluidity, the instantaneous application of pressure by means of a roller or otherwise suffices to bring the glue into contact with the whole area of both of the opposed veneer surfaces. This is not the case when unfoamed glues are used.

The foregoing observations have been confirmed experimentally as follows:

Three ply plywood panels were made from Douglas fir veneers. The face and back plies were ⅛ inch thick and the center ply was 3/16 inch thick.

The glue employed was a foamed phenol-formaldehyde resin glue prepared by mixing for two minutes at 120° F. 360 parts by weight water and 60 parts by weight spray dried animal blood, thereafter adding 1000 parts by weight of 40% solids phenol-formaldehyde resin (the Borden Co.: "W-166 S"), and then mixing for an additional 2 minutes.

The glue was foamed in the foaming apparatus of Cone and Steinberg, U.S. Pat. No. 3,895,984, hereinabove referred to. It was foamed to a density of approximately 0.2. It was applied at the rate of 47 pounds of wet glue per 2000 square feet of glue line. It was extruded in the form of filaments of 0.125 inch diameter spaced apart at a density of 38 filaments per lateral foot.

The panel assemblies then were subjected to various prepressing techniques.

One category was roller prepressed using the technique described herein and employing a steel roll 7 inches in diameter having a weight of 85 pounds per lineal foot, or about 28 p.s.i. The panel assemblies were run rapidly under the roller immediately after being spread with the glue. The prepress time was less than one second.

A second category of panel assemblies was prepressed in a flatbed press according to the conventional method. They were pressed for 2 minutes at 175 psi, 3½ minutes before hot pressing.

The third category of panels was roller prepressed as above, but with the exception that prepressing was delayed until 3½ minutes before the final pressing.

The fourth category of panel assembly was not prepressed at all.

All categories were hot pressed, after assembly times of 5 minutes, 31 minutes and 57 minutes, at 300° F. for 5¾ minutes at 175 psi in a conventional plywood press using two panels per hot press openings. Under these pressing conditions the foam structure of the foam glue was broken, the veneers pressed together, and the glue set to form plywood panels.

The panels were cut into plywood shear test specimens. These were soaked in water over night and then subjected to the standard DFPA tests for shear strength and wood failure. The results are given below:

| Test No. | Prepress | Method | 5' Assemblytime | | 31' Assembly time | | 57' Assembly time | |
|---|---|---|---|---|---|---|---|---|
| | | | Shear (psi) | % wood failure | shear (psi) | % wood failure | shear (psi) | % wood failure |
| 1 | | Roller | 303 | 91 | 232 | 68 | 232 | 76 |
| 2 | Plate | | 289 | 67 | 195 | 48 | 160 | 48 |
| 3 | | Roller | 281 | 92 | 204 | 48 | 171 | 34 |
| 4 | none | none | 301 | 89 | 195 | 44 | 170 | 26 |

The advantages of the application of the hereindescribed method are readily apparent from the foregoing data. In every instance better results are obtained by prepressing. The contrast is greater the longer the assembly time. In addition, the rapid falling off of values with increased assembly times dramatically points out the advantage of prepressing promptly after spreading. This is a result which can be achieved on a continuous, commercial scale basis only by prepressing panel assemblies including glue in a foamed condition.

Having thus described our invention in preferred embodiments, we claim:

1. The method of making plywood which comprises:
   (a) extruding on a surface of a first wood veneer a plywood glue comprising a member of the class consisting of the thermosetting phenol-formaldehyde resin glues, the resorcinol-formaldehyde resin glues, the cresol-formaldehyde resin glues, and the urea-formaldehyde resin glues,
   (b) superimposing a second veneer on the glue-spread surface of the first veneer,
   (c) the glue being extruded on the first veneer in the form of spaced filaments of foamed liquid glue having a density of from 0.1 to 0.5,
   (d) the veneer surface between the filaments being substantially unwetted by the glue,
   (e) the spacing of the filaments and the glue usage being predetermined to insure substantially complete coverage and wetting of both veneers with foamed liquid glue upon the application of prepressing pressure,
   (f) promptly prepressing the assembled veneers at a pressure and for a time only substantially sufficient to spread the filaments and wet the veneers with a veneer-separating layer of unset glue still in foamed condition, thereby tacking the veneers together for preliminary handling, and
   (g) thereafter further pressing the assembled and prepressed veneers at a temperature and for a time sufficient to break the foam structure of the foamed thermosetting glue, to press the veneers together, and to set the glue to its final bonding condition.

2. The method of claim 1 wherein the glue comprises a thermosetting phenol-formaldehyde resin glue.

3. The method of claim 1 wherein the glue comprises a phenol-formaldehyde resin-dried animal blood, plywood glue.

4. The method of claim 1 wherein the filaments of foamed liquid glue have a density of from 0.15 to 0.3.

5. The method of claim 1 wherein the filaments are substantially round and have a diameter of from 1/64 to $\frac{3}{8}$ inch and a spacing on the veneer of from $\frac{1}{8}$ to $\frac{1}{2}$ inch.

6. The method of claim 1 wherein the assembled veneers are prepressed with a press roll at a pressure of from 60 to 90 pounds per lineal foot of roll.

7. The method of claim 1 wherein the assembled veneers are prepressed at about 28 p.s.i. and ambient temperature for a press time of about 1 second.

8. The method of claim 1 wherein the veneer-separating layer of unset glue still in foamed condition is about 3/100 inch thick.

9. The method of claim 1 wherein the prepressed veneers are further pressed at about 175 p.s.i. and about 300° F. for a time of about $5\frac{3}{4}$ minutes.

10. The method of making plywood which comprises:
    (a) spreading a thermosetting phenol-formaldehyde resin glue on the surface of a first wood veneer,
    (b) superimposing a second veneer on the glue-spread surface of the first veneer,
    (c) the glue being spread on the first veneer in the form of filaments of foamed liquid glue having a density from 0.1 to 0.5, the filaments having a diameter of from 1/64 to $\frac{3}{8}$ inch and a lateral spacing on the veneers of from $\frac{1}{8}$ to $\frac{1}{2}$ inch, thereby insuring substantially complete coverage and wetting of both veneers with foamed liquid glue upon the application of prepressing pressure,
    (d) promptly prepressing the assembled veneers at about 28 p.s.i. and ambient temperature for a time sufficient to spread the filaments and wet the veneers with a veneer-separating layer about 3/100 inches thick of unset glue still in foamed condition, thereby tacking the veneers together for preliminary handling, and
    (e) thereafter pressing the assembled and prepressed veneers at a pressure of about 175 p.s.i. and a temperature of about 300° F., for a time sufficient to break the foam structure of the foamed glue, to press the veneers together, and to set the thermosetting glue to its final bonding condition.

* * * * *